May 15, 1923.
A. SUNDH ET AL
1,455,277
INDICATOR
Filed Oct. 8, 1920
3 Sheets-Sheet 3
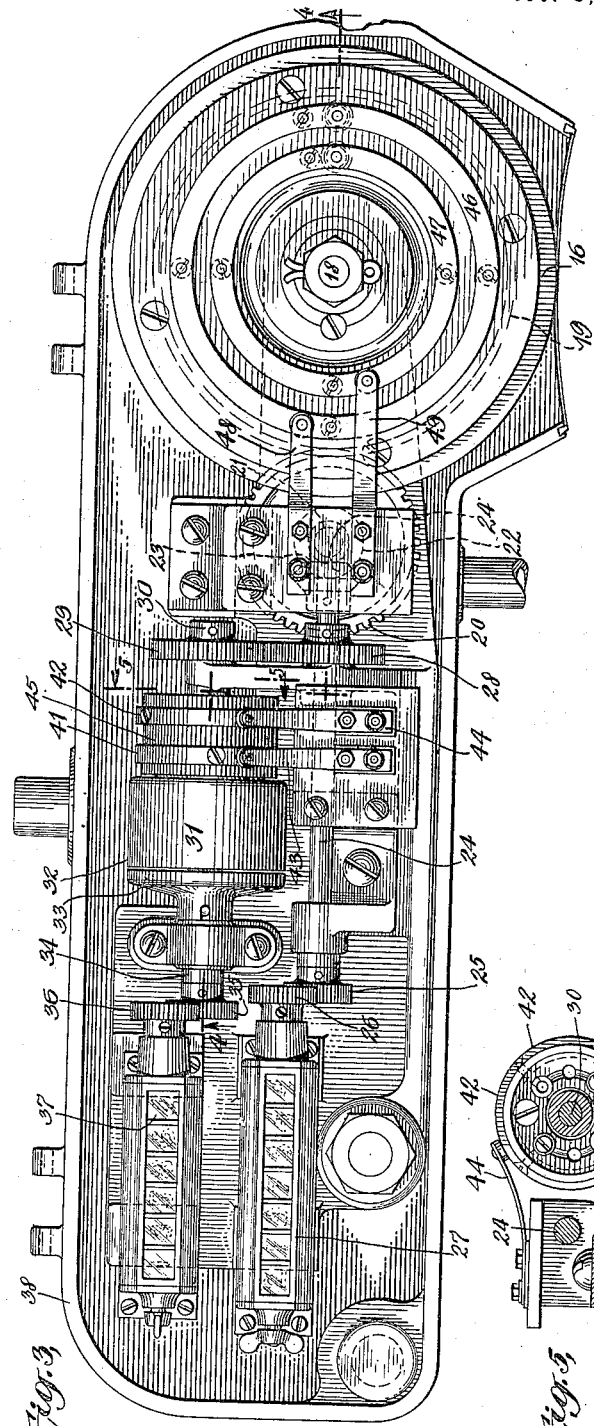
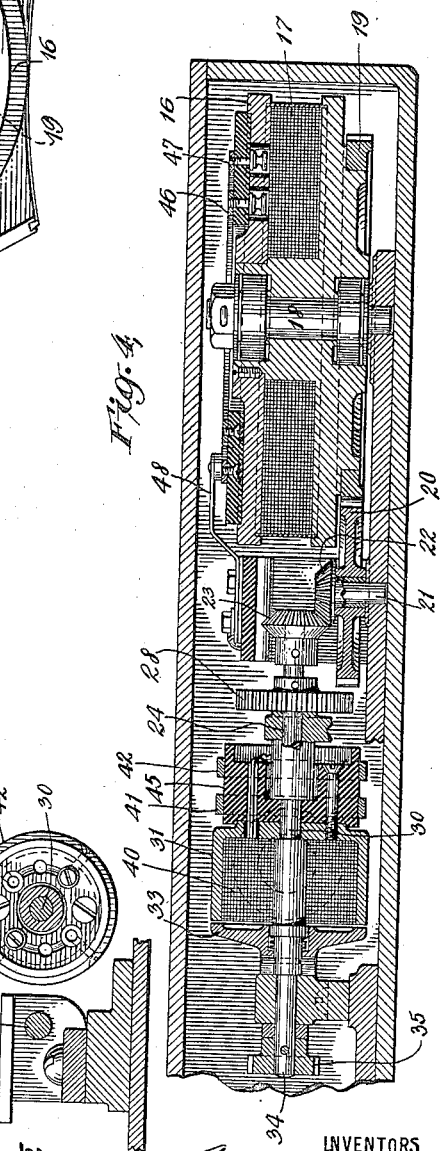
INVENTORS
August Sundh
William Westerman
BY
Niddle and Margeson
ATTORNEYS Patented May 15, 1923.

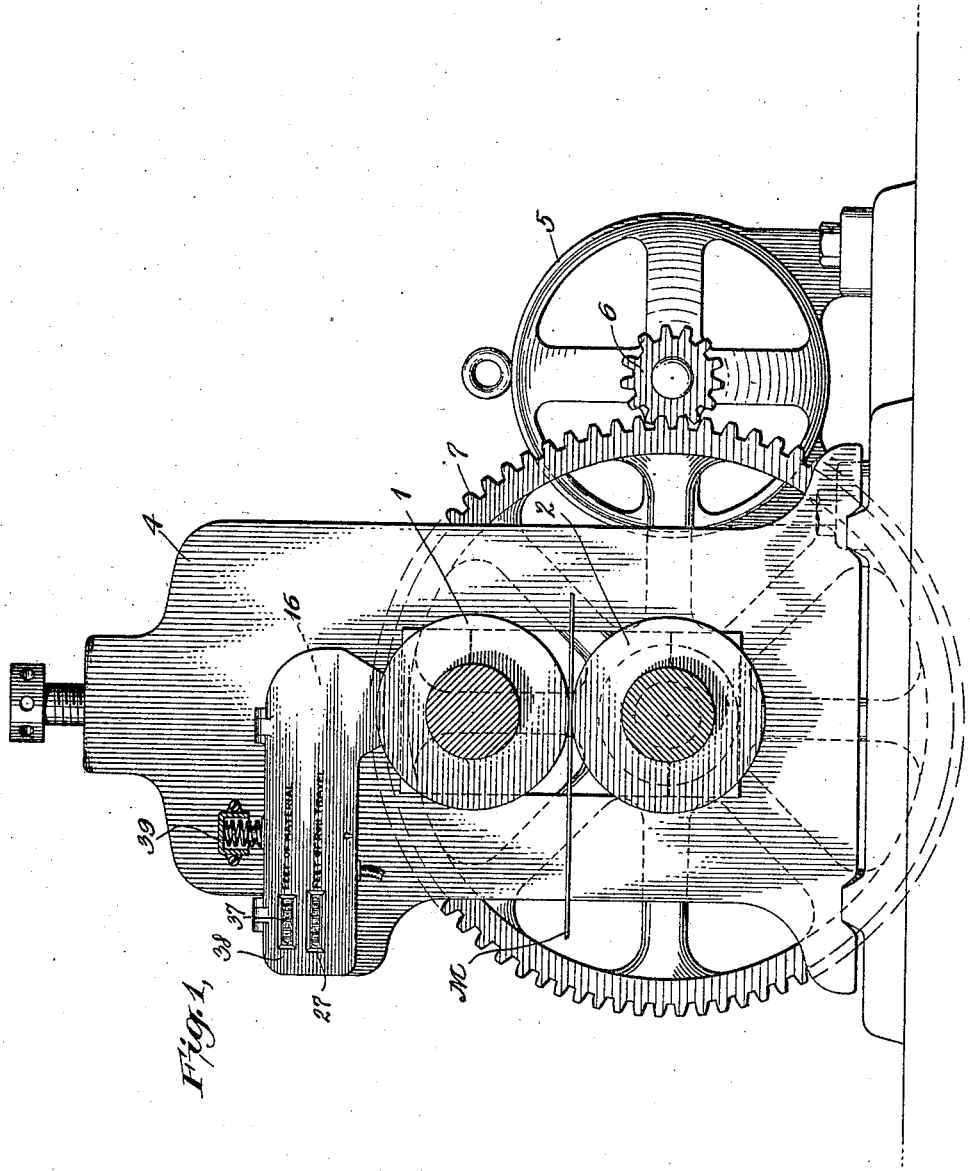

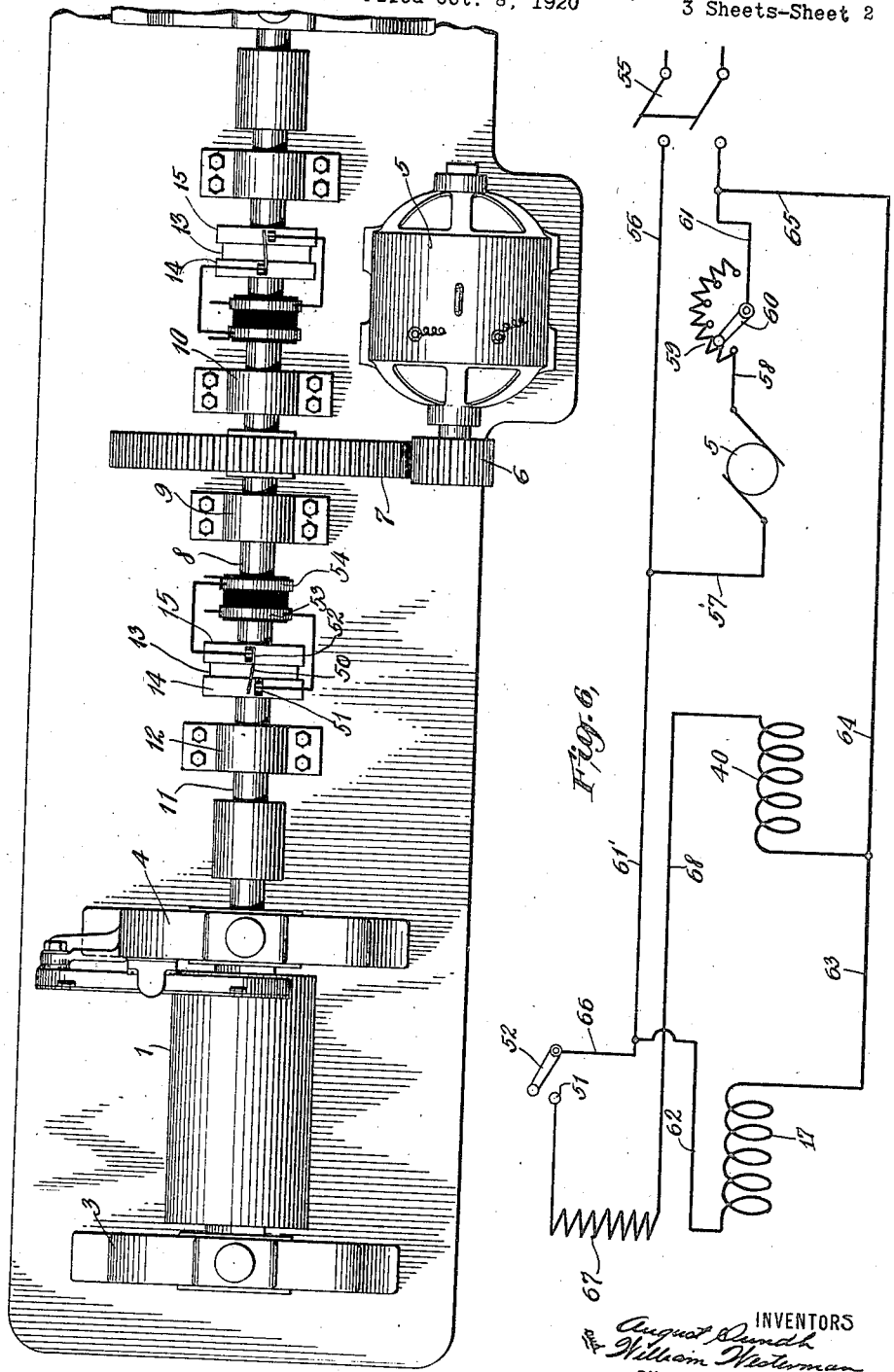

1,455,277

UNITED STATES PATENT OFFICE.

AUGUST SUNDH, OF HASTINGS-UPON-HUDSON, NEW YORK, AND WILLIAM WESTERMAN, OF DETROIT, MICHIGAN.

INDICATOR.

Application filed October 8, 1920. Serial No. 415,514.

*To all whom it may concern:*

Be it known that we, AUGUST SUNDH, a citizen of the United States, and a resident of Hastings-upon-Hudson, county of Westchester, and State of New York, and WILLIAM WESTERMAN, a citizen of the United States, and a resident of Detroit, county of Wayne, and State of Michigan, have invented certain new and useful Improvements in Indicators, of which the following is a specification.

This invention relates to a device adapted to be applied to a mill or mills for indicating the travel of a moving part thereof as well as for indicating the amount of material operated upon by the mill.

Briefly the present apparatus comprises a mill connected by a flexible coupling to an electric motor whereby the mill is driven, the lost motion in the coupling being employed for the closing of a pair of contacts controlling the circuit to an electric clutch, the latter being connected to an indicator for indicating the amount of material being passed through the mill. The indicator for indicating the travel of the mill roll or other moving part of the mill is coupled mechanically to the mill and in addition an electric winding is employed for insuring that there will be no slippage of this coupling.

In the accompanying drawings wherein an embodiment of this invention has been illustrated,—

Figure 1 illustrates the apparatus in end elevation;

Fig. 2 is a plan view of the same;

Fig. 3 is an enlarged, detailed view of the indicating devices;

Fig. 4 is a section taken substantially on the line 4—4 of Fig. 3;

Fig. 5 is a section on the line 5—5 of Fig. 3; and

Fig. 6 is a wiring diagram.

Referring to the drawings in detail, 1 and 2 designate respectively, the upper and lower rolls of a rolling mill, these rolls being suitably supported in the usual manner in frames 3 and 4. The rolling mill is driven by an electric motor 5. The armature shaft of this motor carries a spur gear 6 meshing with a large spur gear 7 mounted upon a shaft 8 having bearings at 9 and 10. The shaft 8 is in alignment with a shaft 11 carried by and rigidly secured to the lower roll 2 of the rolling mill, this shaft having a bearing at 12. The shafts 11 and 8 are connected to each other by a yielding or flexible coupling 13 comprising the two parts 14 and 15. By reason of the fact that the coupling 13 is a yielding or flexible one, the parts 14 and 15 are designed to have a slight rotative movement relative to each other. This fact is taken advantage of for controlling a circuit in a manner hereinafter to be pointed out in detail. Mounted immediately above the upper roll 1 of the rolling mill is a magnetizable, rotatable coupling member 16 shown in detail in Figs. 3 and 4. This member is so mounted relatively to the roll 1 as to be engaged thereby and is provided with a winding 17 which when energized will magnetize the member 16 to cause the same to adhere to the roll 1 so that when the device is in operation no slippage will occur between the roll 1 and the member 16. Mounted on the shaft 18 of the coupling member 16 is a gear 19, this gear meshing with a gear 20 carried by a stub shaft 21, the latter carrying a bevelled gear 22. The gear 22 meshes with a bevelled gear 23 carried by a shaft 24 on the extreme left-hand end of which is mounted a spur gear 25 meshing with a spur gear 26 carried at the end of the shaft of the indicating element 27, this indicating element being designed to register or indicate the travel of the mill roll 1 regardless of whether material is passing through the mill or not. The shaft 24 carrying the gear 23 carries also a spur gear 28 meshing with a spur gear 29 mounted upon a shaft 30 carrying one part 31 of an electric clutch 32, the other member 33 of said clutch being mounted upon a shaft 34 carrying a gear 35 meshing with a spur gear 36 on the end of the operating or driving shaft of the indicating element 37 which is designed for indicating the amount of material passed through the rolling mill.

The entire mechanism shown in Figs. 3 and 4 is mounted within a casing 38 which is yieldingly secured to the frame 4 of the rolling mill and is maintained in position to cause the coupling member 16 to be in engagement with the roll 1 at all times by means of a spring 39. This yielding mounting is provided so that the device as a whole will accommodate itself to varying thicknesses of strips passed through the rolling mill.

The clutch 32 heretofore referred to, and which comprises the members 31 and 32 has a winding 40 within the member 31, this winding receiving current from a source of supply by slip rings 41 and 42 and contacts 43 and 44. The rings 41 and 42 are mounted on an insulating member 45 which in turn is mounted upon the shaft 30 carrying the gear 29 which has already been referred to.

When the winding 40 is energized the member 33 of the clutch is drawn into clutching engagement with the member 31 to cause the gear 35 already referred to, to rotate and thereby drive the indicator 37. The member 16 comprises contact strips 46 and 47 adapted to be rotated when the member 16 is rotating these contact strips cooperating with stationary contacts 48 and 49, respectively, which are connected to a common source of electrical supply.

The coupling 13 which has already been referred to and which comprises two members 14 and 15, having a slight rotative movement relative to each other, carries contact mechanism 50 comprising a contact 51 and a contact 52, the former being carried by the member 14 while the latter is carried by the member 15.

From Fig. 2 it will be seen that if the member 15 under the operation of the motor 5 be moved toward the observer it will cause the contact 52 to engage the contact 51. These contacts are connected to slip rings 53 and 54 which are mounted for rotation with the shaft 8.

In operation the circuit for the motor 5 may be closed by closing the switch 55. The circuit may be traced for the motor now from one side of the line through the motor 5, conductor 58, resistance 59, switch 60, conductor 61, switch 55 to the other side of the line. At this same time a circuit is closed to the winding 17 of the element 16, this circuit being as follows: From one side of the line, through the switch 55, conductors 56, 61', 62, winding 17, conductors 63, 64, 65 to the other side of the line. The winding 17 of the element 16 now being energized, and the element 16 being in contact with the roll 1 of the rolling mill, the indicating element 27 for indicating the travel of the mill roll 1 will be caused to function through the gear train already described. At this time, however, due to the fact that the rolling mill is idling, the indicator 37 will not be functioning, the clutch 22 controlling the same, not yet having been energized.

As soon as a strip M is fed to the rolling mill the extra load placed on the mill will cause a drag on the shaft 11 connected to the mill roll 2, so that the element 15 of the coupling 13 will be rotated slightly relative to the member 14 to cause the contact 52 to be moved into engagement with the contact 51. The closing of this contact 52 upon the contact 51 will close a circuit to the winding 40 of the clutch member 32 which circuit may be traced as follows: From one side of the line through the switch 55, conductors 56, 61' and 66, contacts 52 and 51, resistance 67, conductor 68, winding 40 of the clutch 32, conductors 64 and 65 and switch 55 to the other side of the line. The winding 40 now being energized, the clutch member 33 will be drawn into engagement with the clutch member 31 so that the indicating element 37 will now be driven to register or indicate the amount of material passed through the mill. As soon as a strip has passed through the mill it will be obvious that the contacts 52 and 51 will be automatically separated to open the circuit of the winding 40 of the clutch 32 whereby the indicating element 37 will cease functioning. In the meantime, however, the indicator 27 will continue to function and will so continue until the switch 55 is opened to open the motor circuit 45 to bring the rolling mill to rest.

It will be seen from the foregoing that means have been provided for indicating the movement of a moving part of a mill and also for indicating the amount of material passed through the mill.

It will be seen furthermore that means have been provided whereby a circuit to an electric clutch controlling the indicator for indicating the amount of material passed through the mill is automatically controlled by the material passed through the mill in that until a strip is passed into the mill the circuit to the electric clutch mentioned is maintained open.

It will be obvious from the foregoing that if desired several mills may be driven from the one motor, each mill being provided with its own indicating arrangement.

It will be seen furthermore that the connection between the indicator for indicating the travel of a moving part of the mill and the motor for causing the former to function is mechanical; the connection between the driving motor and the indicator for indicating the amount of material passed through the mill is in part electrical.

It will be obvious furthermore that by providing the winding 17 for the element 16, that is to say the roll which rests upon the mill roll 1, no slippage will occur between the member 16 and the roll 1 so that the indicator 27 will register accurately the travel of the mill.

Obviously changes may be made in the details of construction herein described within the purview of this invention.

What is claimed is:

1. In combination, a mill, an indicator for indicating or registering the amount of material passed through said mill, a motor for driving said mill and indicator, a clutch for connecting the indicator to the mill and a flexible coupling connecting said motor and said mill, said coupling controlling the operation of said clutch.

2. In combination, a mill, an indicator, a motor for driving said mill and indicator, an electric clutch for connecting the indicator to the mill, and a flexible coupling for connecting the mill to the motor and provided with contact mechanism for controlling the circuit of said electric clutch.

3. In combination, a mill, an indicator for indicating the amount of material passed through the mill, a motor for driving the mill, a flexible coupling for connecting the motor to the mill, an indicator and actuating connections between the indicator and mill including an electric clutch and means whereby the flexible coupling controls the circuit of said electric clutch.

4. In combination, a mill, an indicator for indicating the travel of a moving part of said mill, an indicator for indicating the amount of material passed through said mill, a motor for driving the mill and said indicators, and a flexible coupling between the motor and said indicators, said coupling being adapted to control the operation of said last-named indicator.

5. In combination, a mill, an indicator for indicating the travel of a moving part thereof, an indicator for indicating the amount of material passed through said mill, a motor for driving said mill and indicators, an electric clutch for connecting one of said indicators to the mill, a flexible coupling between said motor and mill and contact mechanism carried by said coupling for controlling said electric clutch.

6. In combination, a mill, an indicator for indicating the amount of material passed through said mill, a motor for driving said mill and indicator, a flexible coupling between said motor and said mill, an electric clutch for connecting the mill to the indicator and contact mechanism carried by said coupling and adapted to close the circuit of said electric clutch when a load is placed upon the flexible coupling by material being passed through the mill in the operation of the mill.

7. In combination, a rolling mill, a shaft connected to a roll thereof, a motor, a shaft driven thereby, a flexible coupling for connecting said shafts to each other, an indicator for indicating the amount of material passed between the rolls of said mill, an electric circuit for controlling said indicator and contact mechanism carried by said flexible coupling for closing said circuit when a strip is passed through the mill to cause said indicator to function.

8. In combination, a rolling mill, a magnetizable roller engaging one roll of said mill, an indicator driven by said magnetizable roller for indicating the amount of material passed through said mill, an electric clutch for establishing a driving connection between said roller and indicator, an electric circuit for said clutch, a motor for driving the mill to thereby drive said indicator and a yielding coupling between said motor and mill provided with contact mechanism for controlling said circuit when a strip is passed into the mill to cause said indicator to function.

9. In combination, a rolling mill, a motor for driving the same, a flexible coupling between said motor and mill, an indicator adapted to be driven by said mill for indicating the amount of material passed through the mill, an electric clutch for controlling the operation of said indicator, an electric circuit for said clutch, and contact mechanism carried by said flexible coupling and adapted to be actuated to closed position by entrance of material to said mill, said contact mechanism controlling said circuit for said electric clutch.

This specification signed this 23rd day of Sept., 1920.

AUGUST SUNDH.

This specification signed this 27th day of Sept., 1920.

WM. WESTERMAN.